United States Patent [19]

Mito et al.

[11] Patent Number: 4,779,837

[45] Date of Patent: Oct. 25, 1988

[54] REMOTE CONTROL POPPET VALVE

[75] Inventors: Akio Mito, Kanagawa; Saburo Yajima; Kiyoshi Hayashi, both of Tokyo, all of Japan

[73] Assignee: Tokyo Keiki Co., Ltd., Tokyo, Japan

[21] Appl. No.: 13,294

[22] Filed: Feb. 10, 1987

[30] Foreign Application Priority Data

Feb. 10, 1986 [JP] Japan .................................. 61-27543
Feb. 10, 1986 [JP] Japan .................................. 61-27544

[51] Int. Cl.[4] .............................................. F16K 31/122

[52] U.S. Cl. ........................................ 251/26; 251/25; 251/30.03; 251/30.04; 251/30.05; 251/38

[58] Field of Search ............. 251/25, 26, 30.03, 30.04, 251/30.05, 38

[56] References Cited

U.S. PATENT DOCUMENTS 1,125,825 1/1915 Englesson ...................... 137/625.63
4,239,179 12/1980 Geier ..................................... 251/38
4,610,423 9/1986 Morino .................................. 251/25
4,662,600 5/1987 Schwelm .......................... 251/30.03

FOREIGN PATENT DOCUMENTS 3228430 5/1983 Fed. Rep. of Germany ........ 251/25

*Primary Examiner*—Gerald A. Michalsky
*Attorney, Agent, or Firm*—Sughrue, Mion, Zinn, Macpeak, and Seas

[57] ABSTRACT

A poppet valve in which a poppet is slidable in a valve body and opens or closes a main valve path for pressurized fluid at one end. The pressurized fluid is conveyed to a back pressure chamber at the rear of the poppet either through a reduced flow path or through a valve arrangement between the surfaces of the poppet and a poppet spool slidable within the poppet. Either a control rod or the poppet spool moving relative to the poppet opens a flow path at the side of the back pressure chamber and the flow continues through a hollow in the spool or the control rod to an oil chamber away from the back pressure chamber where it is released to a tank.

12 Claims, 9 Drawing Sheets

REMOTE CONTROL POPPET VALVE

BACKGROUND OF THE INVENTION

1. Field of the Invention

The present invention relates to a remote control poppet valve in which a poppet in a poppet valve body is caused to move while following an input member.

2. Background of the Invention

Conventionally, as the remote control poppet valve of this kind as described above, there has been proposed a poppet valve as shown, for example, in FIG. 1.

This poppet valve will be briefly described. A poppet 12 for opening/closing a main flow path 11 is accommodated in a valve body 10. A pilot spool 13 provided integrally with a rod 14 is slidably inserted in the poppet 12 so as to constitute a pilot valve.

The rod 14 projects into a spring chamber 17 formed in a cover 15 fixed to the valve body 10 so as to be biased by a spring 18. The pilot spool 13 is pushed by a proportional solenoid 16 through the rod 14 so that the pilot spool 13 is positioned at a position where the force of the spring 18 is balanced with the output of the proportional solenoid 16.

The pilot valve of the poppet 12 and pilot spool 13 is changed over by the proportional solenoid 16 to take pressurized oil into and out of a back pressure chamber 19 so as to control the position of the poppet 12.

In such a conventional remote control poppet valve as described above, however, the poppet 12 is operated in such a manner that the poppet spool 13 is inserted into a center hole in the poppet 12 so as to constitute a pilot valve. The oil taken in from a flow inlet is taken into the back pressure chamber 19 through the pilot valve. On the other hand, the pilot oil is discharged from a flowing outlet communicated with the main flow path. Therefore, when the poppet is operated to open the main flow path, the pilot oil in the back pressure chamber flows into the main flow path from the flowing outlet, so that the pilot oil is added to that flowing into the main flow path between the inlet port and the outlet port.

As a result, the pilot oil flows as an instantaneously formed flow while it is a small quantity. Therefore, there has been such a problem that a cylinder positioned downstream is instantaneously moved.

Further, even when the poppet is controlled so as to fully close the main flow path, the fully closed state is not perfectly realized because there exists a leakage from the pilot spool 13 to the flow outlet. Furthermore, there has been such a problem that an emergency operation cannot be performed when the pilot spool 13 becomes inoperative because the poppet 12 is controlled only by the pilot spool 13.

Another type of a conventional poppet valve will be briefly described with reference to FIG. 2. A poppet 102 is accommodated in a valve body 101 and is urged in the direction to close the valve by a spring 103. In the poppet 102, a passage having a orifice 104 is formed for causing an inlet port 105 to communicate with a back pressure chamber 106. A passage 109 having a conical opening portion 108 is formed for causing the back pressure chamber 106 to communicate with an outlet port 107.

The poppet 102 is caused to follow an input rod 110 with an orifice 111 formed between the poppet 102 and a front end portion of the input rod 110. That is, when the input rod 110 is pushed right in the drawing, The orifice 111 is closed to thereby increase a pressure in the back pressure chamber 106 so that the right edge of the poppet 102 is caused to come into close contact with a seat portion 112 to thereby close a flow path between the inlet and outlet port 105 and 107 as shown in the drawing.

When the input rod 110 is caused to move left in the drawing, on the contrary, the poppet 102 moves while following the input rod 110. As a result, the poppet 102 is separated from the seat portion 112 to thereby open the flow path.

In such a second conventional remote control poppet valve as described above, however, a simple rodlike operation rod 110 projects outwards from the back pressure chamber 106 so that a pressure at the outlet port 107 acts on a sectional area of the operation rod 110. Accordingly, a large operation force was required to cause the poppet to move while following the input rod which was driven at an exceedingly high speed. Consequently, the conventional remote control poppet valve is unsuitable for high-speed driving.

Furthermore, similarly to the first conventional poppet valve, even if the operation for opening the flow path between the inlet and outlet ports 105 and 107 is performed at a high speed, pilot oil instantaneously flows from the back pressure chamber 106 into the outlet port 107 so that the flow is added to the original one. Therefore, there has been such a problem that a cylinder or the like located downstream the outlet port 107 is caused to move instantaneously.

Further, even when the poppet is controlled so as to fully close the flow path, there has been such a problem that if a leak occurs at the orifice 111, this leakage appears at the outlet port 107 as it is. Moreover, the poppet is controlled only by the operation rod 110. Accordingly, there has been such a problem that an emergency operation cannot be performed in the case where it becomes impossible to operate the operation rod 110 for some reason.

SUMMARY OF THE INVENTION

The present invention has been attained in order to solve the foregoing problems.

To this end, the remote control poppet valve according to a first aspect of present invention includes a poppet slidably accommodated in a valve body for opening and closing a main flow path. The poppet has an end surface exposed to a back pressure chamber. A hollow pilot spool is slidably inserted in the poppet and projects through the back pressure chamber into an oil chamber communicated with a discharge port outside the back pressure chamber. A flow path opening/closing means is provided in the surfaces of the poppet and the pilot spool sliding relative to each together for opening/closing a flow path for supplying the back pressure chamber with pilot oil. Thereby an opening portion between the poppet and the pilot spool at the back pressure chamber side is made to communicate with the discharge port through a hollow oil path formed in the pilot spool and the oil chamber.

When the pilot spool is displaced, for example, in the direction to be pushed into the poppet, the flow path for supplying pilot oil is opened so that the pilot oil flows into the back pressure chamber through the flow path and the poppet is caused to move by a pressure in the back pressure chamber so as to close the main flow path.

When the pilot spool is displaced in the direction to be pulled out of the poppet, on the contrary, the flow path for supplying pilot oil is blocked so that the pilot oil in the back pressure chamber flows from the opening portion formed by the poppet and the pilot spool into the discharge port through the hollow oil path in the pilot spool and the oil chamber into which the pilot spool is projected to thereby reduce the oil pressure in the back pressure chamber so as to move the poppet so as to open the main flow path.

In the case, no pilot oil flows into the main flow path.

Alternatively, the remote control poppet valve according to a second aspect of the present invention is a poppet valve in which a poppet for opening/closing a main flow path is slidably accommodated in a valve body and in which a pressure at an inlet port of the main flow path is caused to act on one surface of the poppet and a pressure in a back pressure chamber to which the other surface of said poppet is exposed is controlled to drive the poppet. A hollow input rod is slidably provided in the valve body such that the input rod projects into the back pressure chamber so as to come into contact with and separate from or come into and out of the poppet for causing the poppet to follow the input rod to thereby performing positioning of the poppet. As a result, the back pressure chamber can be communicated with a pilot oil discharge port through a hollow portion of the input rod. Furthermore, a directional valve is provided for connecting the pilot oil discharge port to a returning line in a period of control while closing the pilot oil discharge port or connecting the pilot oil discharge port to a hydraulic source in a period of non-control.

In control operation of this second aspect of the present invention, when the input rod is displaced in the direction to separate from the input rod from the poppet, pilot oil in the back pressure chamber is instantaneously discharged through the hollow portion of the input rod from the pilot oil discharge port in the tank. Therefore, the poppet is rapidly caused to move in response to the displacement of the input rod to thereby open the main flow path.

Further, a pressure receiving area of the input rod is made small because the input rod is made hollow. Therefore, the input rod can be operated by a small force and can be driven at a high speed.

Pilot oil in the back pressure chamber flows through the hollow portion of the input rod in the pilotoil discharge port provided separately from the main flow path. Therefore, a controlled flow rate hardly appears at the outlet port of the main flow path.

In non-control operation, when the discharge port is closed or communicates with the hydraulic source by the directional valve, an oil pressure in the back pressure chamber is increased so that the poppet moves independently of the position of the input rod to thereby close the main flow path.

DETAILED DESCRIPTION OF THE PREFERRED EMBODIMENTS

Embodiments according to the present invention will be described hereunder with reference to the accompanying drawings.

First Embodiment

Figure 3:
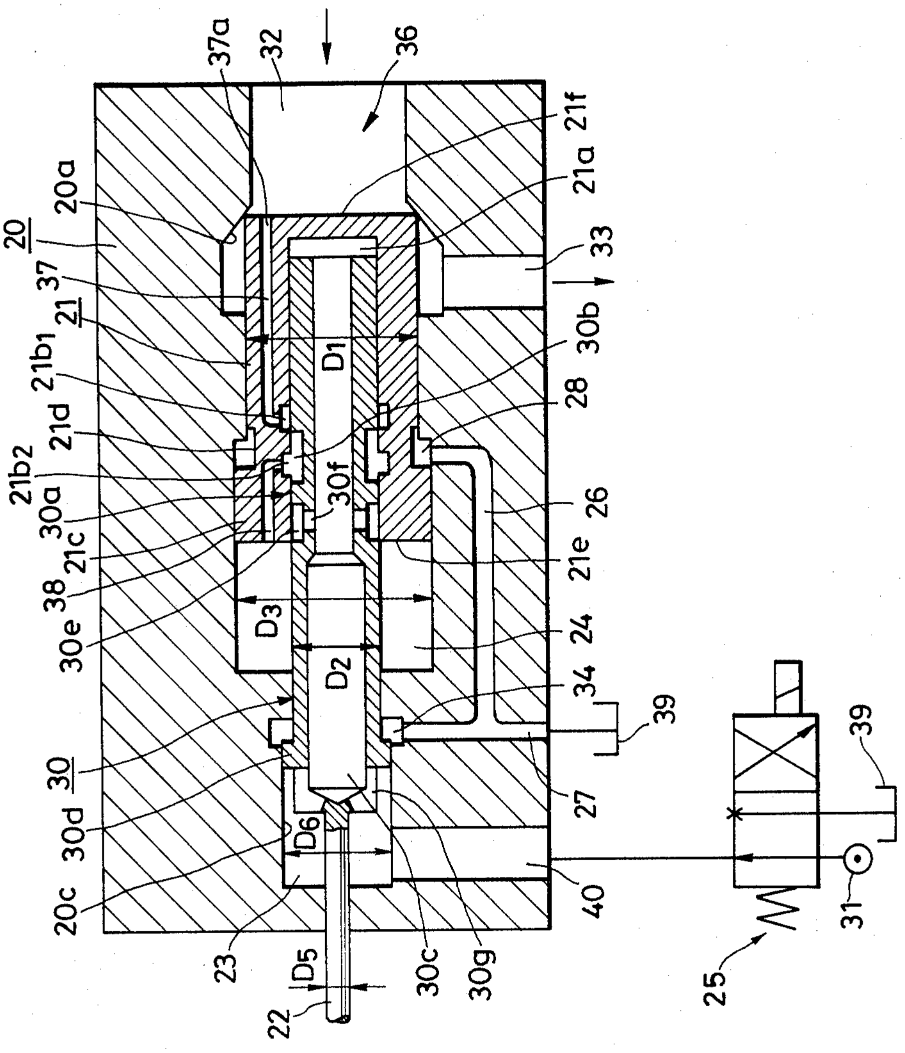
FIG. 3 is a longitudinal section showing a first embodiment according to the present invention.

FIG. 3 is a cross section showing a first embodiment according to the present invention, in which a poppet 21 slidably accommodated in a valve body 20 controls an opening of a main flow path 36 causing an inlet port 32 to communicate with an outlet port 33 through a gap formed between a front edge of the poppet 21 and a conical surface 20*a* of the valve body 20. The conical surface 20*a* constitutes a valve seat.

The poppet 21 is shaped with a small diameter portion 21*d* formed between a back large diameter portion 21*c* (diameter $D_3$) and a main diameter portion (diameter $D_1$). The poppet 21 has at its internal portion an axially opened hole 21*a* having a bottom. Circumferential grooves 21*b*$_1$and 21*b*$_2$ are formed in a peripheral wall of the hole 21*a* so as to communicate with axial flow paths 37 and 38 respectively.

The flow path 37 is provided with an opening portion 37*a* opening into the inlet port 32 so as to form an inlet through which pilot oil flows in.

The other flow path 38 is provided with an opening portion opening into a back pressure chamber 24 to which a back surface 21e of the poppet 21 is exposed. When pilot oil flows from the inlet port 32 into the back pressure chamber 24 through the serial path of the flow path 37 of a circumferential groove of a pilot spool 30 described later, and of the flow path 38, the poppet 21 is urged right in FIG. 3 so as to close the main flow path 36.

That is, the diameter $D_3$ of the large diameter portion 21*c*, the diameter $D_1$ of the main diameter portion, and a diameter $D_2$ of the pilot spool 30 are selected to satisfy the relation $(\pi/4)(D_3^2-D_2^2)>(\pi/4)D_1^2$, so that a pressure receiving area of the back surface 21e of the poppet 21 is larger than that of an end surface 21f of the poppet 21 at the side of the main flow path 36 so that the poppet 21 is urged against the conical surface 20*a* constituting the valve seat by a force for closing the main flow path 36.

An oil chamber 28 which is formed between the small diameter portion 21*d* of the poppet 21 and the valve body 20 communicates with a tank 39 through a passage 26 formed in the valve body 20 and through a discharge port 27 for discharging pilot oil.

The pilot spool 30 has at its outer circumference a land portion 30*a* and is slidably inserted into the hole 21*a* of the poppet 21. The pilot spool 30 is arranged to be axially moved so that the flow paths 37 and 38 either communicate with each other through a circumferential groove 30b formed in the land portion 30*a* at the right side thereof or are closed off from each other.

Figure 4:
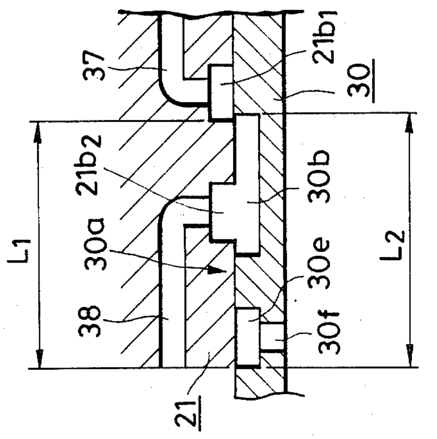
FIG. 4 is an enlarged section showing the main parts of the same embodiment for explaining the relationship between the land portion of the pilot spool and the circumferential grooves of the poppet.

In the land portion 30*a*, as shown in FIG. 4 the lengths $L_1$ and $L_2$, determining the positions of the grooves 30*f*, 30*b* and 21*b*, are selected to satisfy the relation $L_1>L_2$. On the one hand where a difference between $L_1$ and $L_2$ is made too large, however, a leakage is generated in positioning operation. On the other hand if the difference is made too small, vibrations are generated in changing-over operation. Therefore, it is necessary to determine the dimensional relationship by taking the foregoing points into consideration.

The pilot spool 30 is provided with a large diameter portion 30*d* (diameter $D_6$) formed in the vicinity of its rear end portion (left in FIG. 3) and is provided at its hollow internal portion with an axial hollow oil path 30*c*. A radial through hole 30*f* communicates with the back pressure chamber 24 through a circumferential groove 30*e* and is connected to the hollow oil path 30*c* at substantially its center portion.

Figure 5:
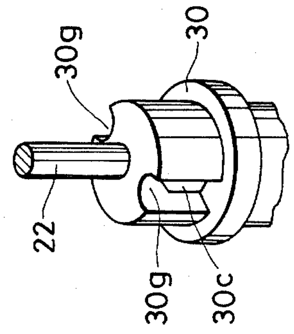
FIG. 5 is a perspective view showing the main parts of the operation rod when viewed from the rear end portion thereof in the same embodiment.

The large diameter portion 30*d* of the pilot spool 30 is slidably inserted in a sliding hole 20*c* formed in the valve body 20. An operation rod 22 having a small diameter ($D_5$) and projecting out of the valve body 20 is integrally fixed on a front end portion of the pilot spool 30, as shown also in FIG. 5. A pair of notch portions 30*g* are provided on opposite sides at an end of the pilot spool 30 in the vicinity of the operation rod 22 so as to communicate the hollow oil path 30*c* with an oil chamber 23. The oil chamber 23 is communicated with a discharge port 40 which is connected to an hydraulic source 31 and a tank 39 through a solenoid valve 25. The solenoid valve 25 is a directional valve to change over the connection of the discharge port 40 to the other elements.

The solenoid valve 25 is normally changed-over so as to make the discharge port 40 communicate with the tank 39 but is changed over so as to make the discharge port 40 communicate with the hydraulic source 31 in an emergency.

Further, an oil chamber 34 formed by a difference in diameter between the large diameter portion 30*d* and the main diameter portion of the pilot spool 30 is communicated with the tank 39 through the discharge port 27.

The diameter $D_6$ of the large diameter portion 30d and the diameter $D_2$ of the main diameter portion of the pilot spool 30, and the diameter $D_5$ of the operation rod 22 are selected to satisfy the relation $(\pi/4)(D_6^2-D_2^2)\approx(\pi/4)D_5^2$, so as to balance areas receiving from the right and left sides. Therefore, no projecting force or no pulling-in force acts on the operation rod 22 even when high-pressured oil flows into the oil chamber 23.

Next, the operation of this embodiment will be described.

When the operation rod 22 is pushed right in FIG. 3, the pilot spool 30 moves right so that the land portion 30*a* makes the flow paths 37 and 38 communicate with each other through the circumferential groove 30*b*.

At this time, the opening portion 30f for making the back pressure chamber 24 communicate with the hollow oil path 30*c* of the pilot spool 30 is closed. Therefore, pilot oil flowing from the inlet port 32 flows from the opening portion 37*a* into the flow path 37 and then further flows through the circumferential groove 30*b* and the flow path 38 into the back pressure chamber 24 to thereby increase a pressure in the back pressure chamber 24.

As described above, since the pressure receiving area of the back surface 21*e* of the poppet 21 is made larger than that of the end surface 21*f* at the main flow path 36 side, the poppet 21 is urged right so that the main flow path 36 is closed because the front edge of the poppet 21 is caused to closely come into contact with the conical surface 20*a lconstituting the valve seat.*

Next, when the operation rod 22 is caused to move left in the drawing, the pilot spool 30 also moves left to thereby close the flow paths 37 and 38 so that an opening portion is formed at the side of the back pressure chamber 24 by the poppet 21 and the pilot spool 30.

As a result, the back pressure chamber 24 is communicated with the hollow oil path 30*c* through the opening portion and the through hole 30*f* of the pilot spool 30 so that the pilot oil in the back pressure chamber 24 flows into the discharge port 40 through the hollow oil path 30*c*, the notch portion 30*g*, and the oil chamber 23. At this time, the poppet 21 is caused to move left by pressurized oil applied to the end surface 21*f* to thereby open the main flow path 36.

In the remote control poppet valve, although the solenoid valve 25 is normally changed over so as to make the discharge port 40 communicate with the tank 39 as described above, the solenoid valve 25 is changed over only in an emergency to connect the discharge port 40 to the hydraulic source 31 to thereby cause high-pressured oil to flow into the oil chamber 23. As a result, a high pressure acts on the hole 21*a* of the poppet 21 through the hollow oil path 30*c* of the pilot spool 30 to thereby move the poppet 21 right independently of the position of the operation rod 22 to close the main flow path 36.

Second Embodiment

Figure 6:
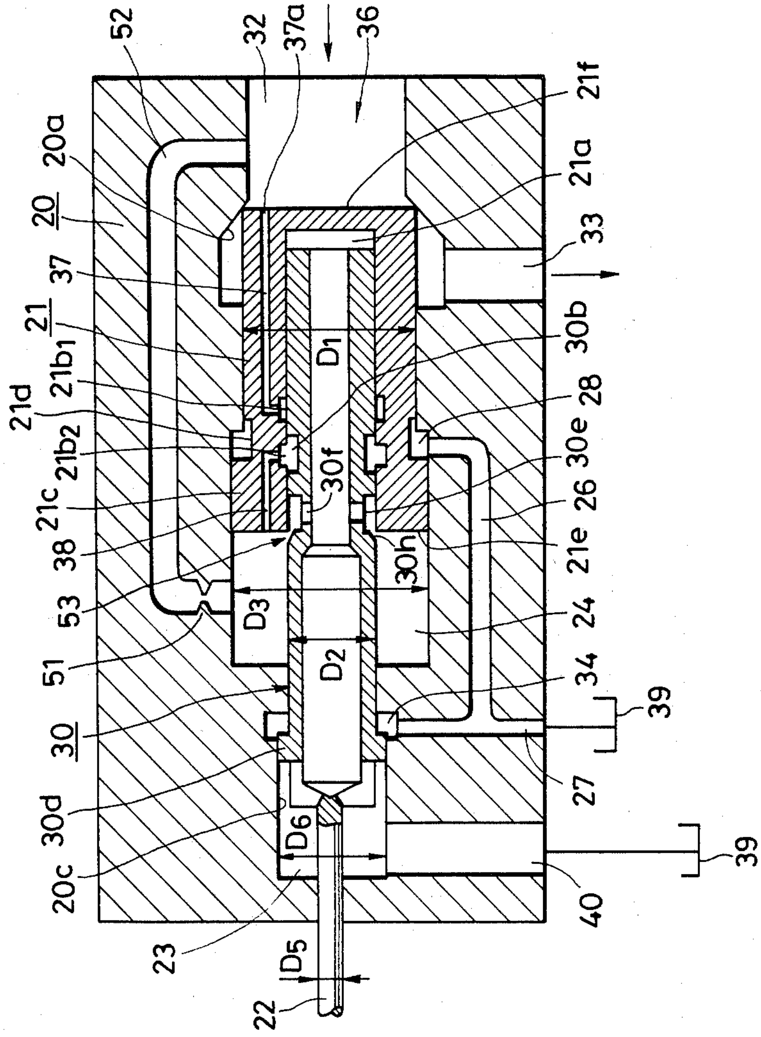
FIG. 6 is a longitudinal section showing a second embodiment according to the present invention.

FIG. 6 shows a second embodiment according to the present invention. In the embodiment of FIG. 6, items corresponding to those in FIG. 3 are correspondingly referenced, and the explanation of these items is omitted.

Figure 7:
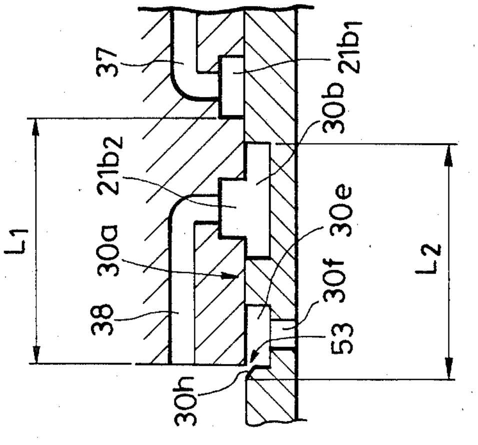
FIG. 7 is an enlarged section showing the main parts of the same embodiment for explaining the relationship between the land portion of the pilot spool and the circumferential grooves of the poppet.

This embodiment is different from the first embodiment of FIG. 3 in that a valve body 20 is provided with a flow path 52 having an orifice 51. Also, a small triangular notch groove 30*h* shown in FIG. 7 is provided in a land edge portion of the circumferential groove 30*e* of the pilot spool 30 at the side of the back pressure chamber 24 so as to form an opening portion 53 between the pilot spool 30 and a poppet 21.

The opening portion 53 is selected to have a size corresponding to that of the orifice 51. Thereby, pilot oil having the same quantity as that flowing into the back pressure chamber 24 through the orifice 51 is caused to flow through the opening portion 53 so as to perform the positioning of the pilot spool 30 and the poppet 21.

In this embodiment, a flow path 37 assumes its fully closed state in positioning the pilot spool 30 and the poppet 21. Accordingly, if the lengths $L_1$ and $L_2$ shown in FIG. 7 are selected to satisfy the relation $L_1 > L_2$, no troublesome leakage is generated even in the case where a difference between the lengths $L_1$ and $L_2$ is increased because the leakage depends on the orifice 51. Further, even in the case where the difference is made too small, no vibrations are ever generated in the pilot spool 30 and the poppet 21 because the flow path 37 is arranged to be not opened in positioning the pilot spool 30 and the poppet 21.

Although the solenoid valve 25 of FIG. 3 is omitted in this embodiment, a discharge port 40 may be connected to selected one of a hydraulic source and a tank in a switching manner through a two-position directional valve similar to the solenoid valve 25 of the first embodiment when a directional valve is to be used in view of safety rod 22 becomes inoperative.

If the solenoid valve is of the type which is used to open and close the connection to the tank, the closing operation can be surely performed while the speed of the operation is slow.

In these embodiment, although the flow path 37 is not communicated with a flow path 38 when the quantity of operation stroke of the operation rod 22 is small in the closing operation, these flow paths are communicated with each other through the circumferential groove 30*b* in the case where the size of operation stroke is large so that a large quantity of pilot oil can be instantaneously sent into the back pressure chamber 24 in addition to the pilot oil supplied through the flow path 52 to thereby make it possible to perform a high speed following operation.

Third Embodiment

Figure 8:
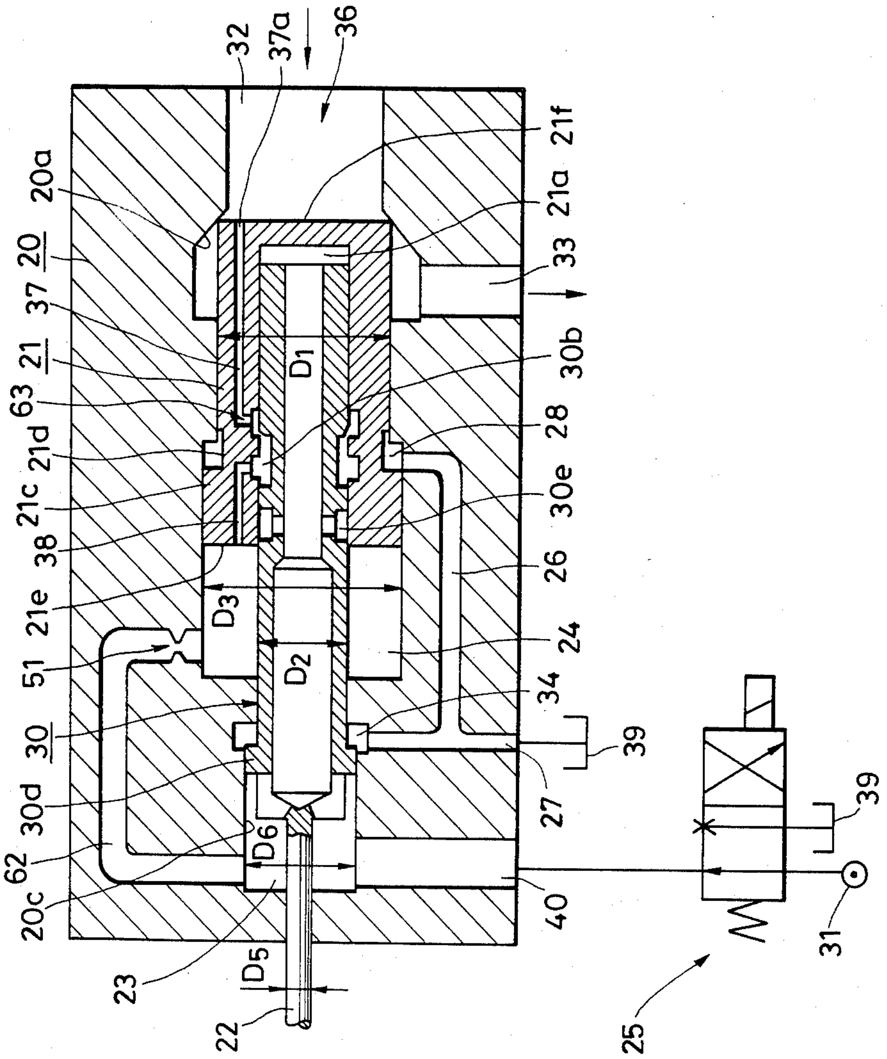
FIG. 8 is a longitudinal section showing a third embodiment according to the present invention.

FIG. 8 shows a third embodiment according to the present invention. In the embodiment of FIG. 8, items corresponding to those in FIGS. 3 and 6 are correspondingly referenced, and the explanation of these items is omitted.

This embodiment is different from the second embodiment of FIG. 6 in that a flow path 62 having an orifice 51 is provided between the back pressure chamber 24 and the oil chamber 23. Also, a triangular notch groove is provided in a right land edge portion in FIG. 8 of the circumferential groove 30*b* of the pilot spool 30 to thereby form an opening portion 63 between the pilot spool 30 and the poppet 21.

Further, similarly to the first embodiment, a discharge port 40 is arranged so as to be connected to a selected one of a hydraulic source 31 and a tank 39 in a switched manner through a solenoid valve 25. When the poppet 21 is controlled so as to fully close a main flow path at a high speed, the connection of the discharge port 40 is changed over to the hydraulic source 31 so that pressurized oil is supplied to the discharge port 40 to close the main flow path at as high speed.

Forth Embodiment

Figure 9:
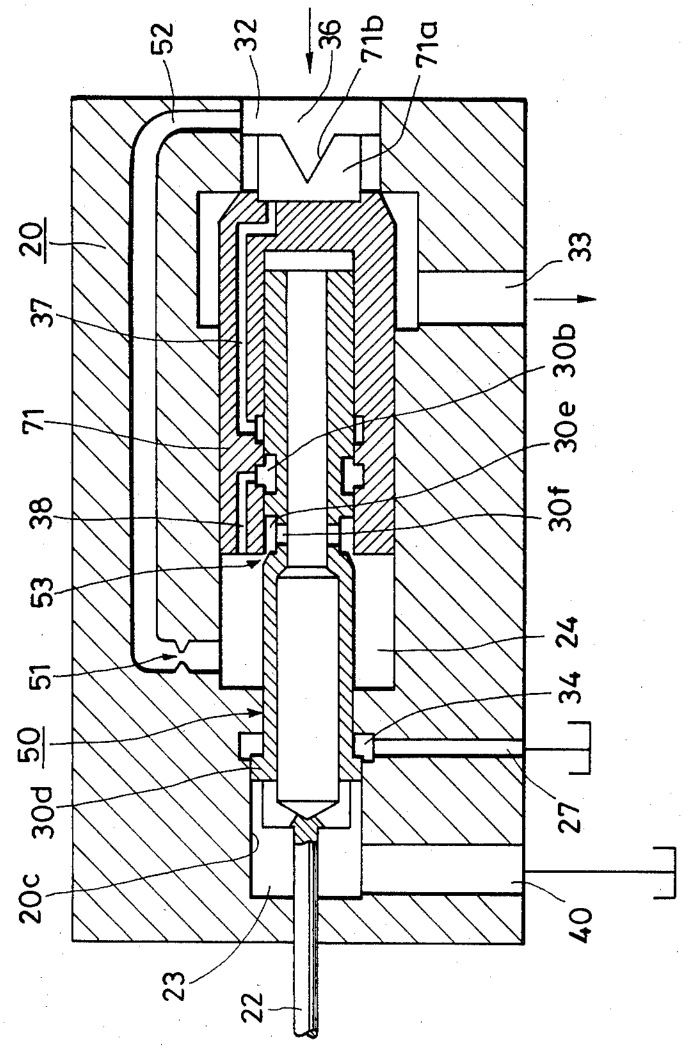
FIG. 9 is a longitudinal section showing a fourth embodiment according to the present invention.

FIG. 9 shows a fourth embodiment according to the present invention. In the embodiment of FIG. 9, items corresponding to those in FIGS. 3 and 6 are correspondingly referenced, and the explanation of these items is omitted.

In this embodiment, a poppet 71 of a different type from that of the embodiments of FIGS. 3 and 6 is used.

The poppet 71 has a V-cut groove 71*b* formed at its front-end cylindrical portion 71*a* to be inserted into a main flow path 36. The poppet 71 is slid so as to control the opening and closing operation of a flow path between the inlet port 32 and the outlet port 33, that is, the flow rate of oil flowing into the main flow path 36.

The operational principle of this embodiment is the same as that of the second embodiment of FIG. 6.

Figure 1:
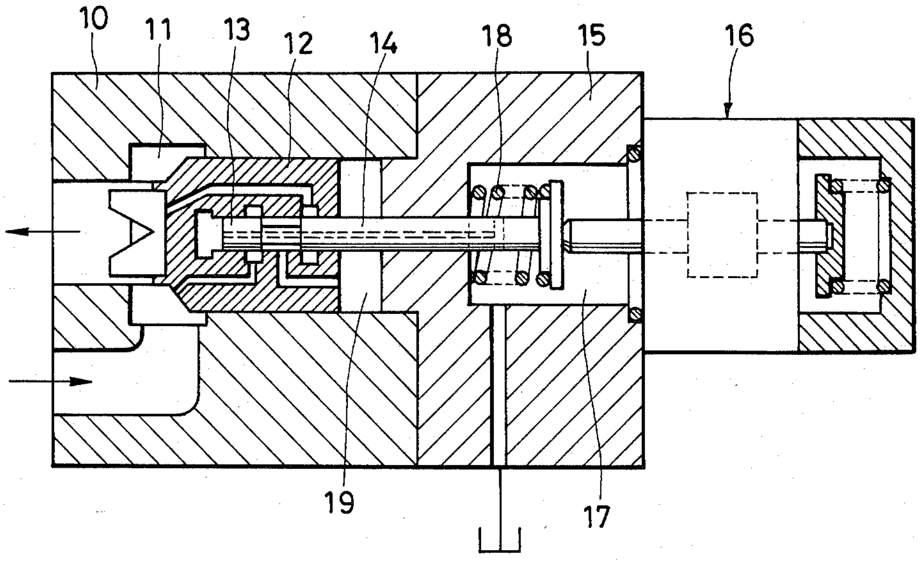
FIG. 1 PRIOR ART
FIG. 1 is a longitudinal section showing a conventional remote control poppet valve.

Although the operation rod is fixed integrally with the rear end of the pilot spool in each of the foregoing embodiments, the operation rod may be provided separately from the pilot spool, or the pilot spool may be driven only in one direction by means of an electromagnetic actuator, for example, a proportional solenoid while applying a returning force to the pilot spool by using a spring in the same manner as in the prior art of FIG. 1.

As described above, in the remote control poppet valve according to the present invention, pilot oil in the back pressure chamber is discharged through the hollow oil path in the main flow path, so that there is no possibility that in the valve opening operation the pilot oil is discharged to flow into the main flow path to thereby instantaneously move a cylinder located in the downstream portion of the main flow path. Further, even when leakage occurs between the poppet and the pilot spool, the leakage never appears in the main flow path in the case of opening control of the poppet or in the fully closed state of the poppet.

Further, when the directional valve is provided at the pilot oil discharge port side so as to directional the connection of the discharge port, the poppet valve can be closed independently of the position of the operation rod, so that an emergency operation can be carried out.

Moreover, each of the second through fourth embodiments has such an arrangement that the performance is hardly affected by an error in accuracy of finishing of the land portion, and therefore the poppet valve can be produced at a low cost. Further, a remote control poppet valve which can close a main flow path with high safety and at a high speed in control operation can be realized by using the orifice which can be inexpensively produced together with the pilot spool.

Several embodiments according to the second aspect of present invention will now be described.

Fifth Embodiment

Figure 10:
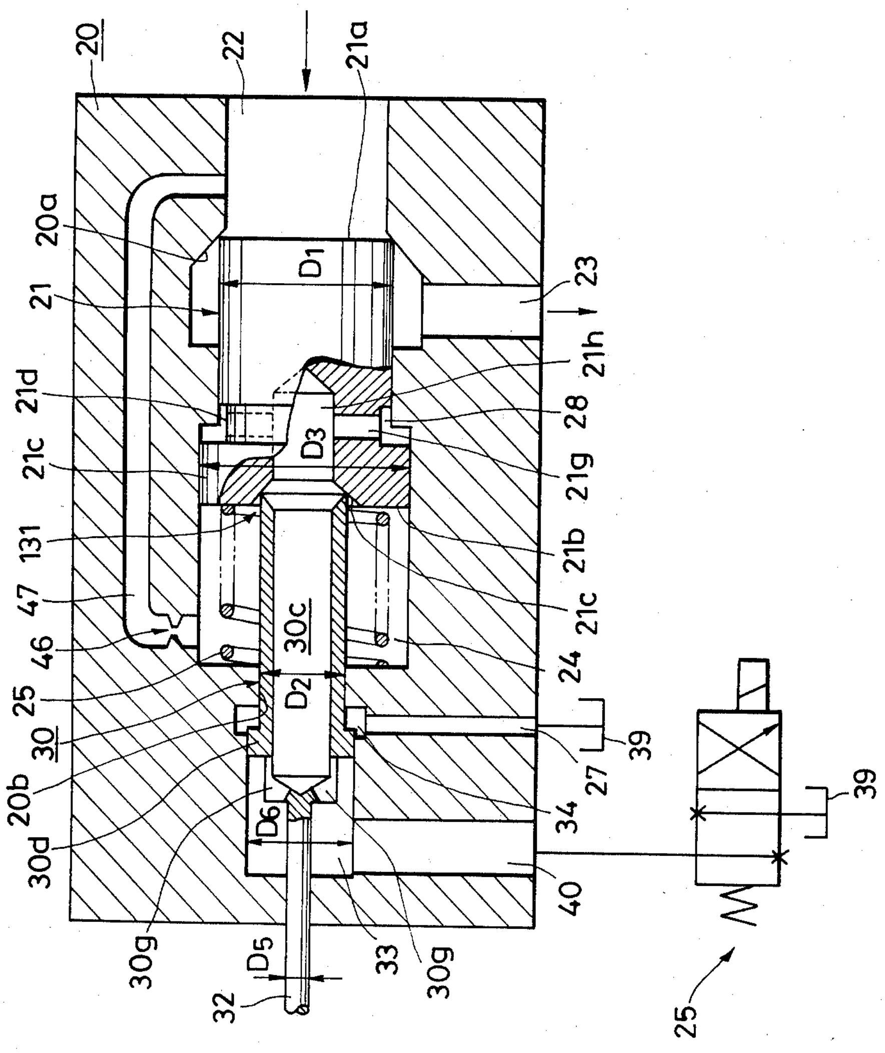
FIG. 10 is a longitudinal section showing a fifth embodiment according to the present invention.

FIG. 10 is a cross section showing a fifth embodiment according to the present invention.

In this embodiment, a substantially equal area poppet 21 is slidably accommodated in a valve body 20. An opening of a main flow path between an inlet port 22 and an outlet port 23 is controlled by a gap formed between a front edge of the poppet 21 and a conical surface 20*a* of the valve body 20 constituting a valve seat.

The poppet 21 is urged in the direction to close the opening of the flow path by a spring 25 provided in a back pressure chamber 24.

The pressure at the inlet port 22 acts onto an end surface 21*a* (the right end surface in FIG. 10) of the poppet 21. A passage 47 is formed in the valve body 20 for causing pilot oil to flow through an orifice 46 from the inlet port 22 into the back pressure chamber 24 to which the other end surface 21*b* of the poppet 21 is exposed.

The poppet 21 is provided with a large diameter portion 21*c* (diameter $D_3$) which is formed at the side of the back pressure chamber 24 and with a small diameter portion 21*d* which is formed between the large diameter portion 21*c* and a main diameter portion (diameter $D_1$) so that an oil chamber 28 is formed between the poppet 21 and the valve body 20. Further, a center hole 21h having a conical opening portion 21i opening into the back pressure chamber 24 is axially bored from the end surface 21*b* of the large diameter portion 21*c*. A passage hole 21*g* is diametrically formed in the small diameter portion 21*d* for making the center hole 21h and the oil chamber 29 communicate with each other.

A hollow input rod 30 having an internal passage 30c, on the other hand, is slidably inserted in a sliding hole 20*b* formed in the valve body 20. A front end portion of the input rod 30 projects into the back pressure chamber 24 so as to be made to come into contact with and separate form the conical opening portion 21*c* of the end surface 21*b* of the poppet 21, with an orifice 131, being formed between the input rod 30 and the poppet 21.

Figure 11:
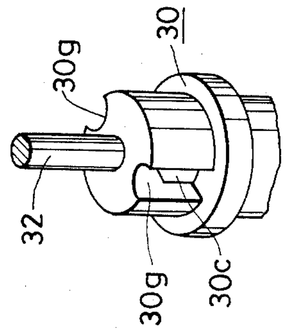
FIG. 11 is a perspective view showing the operation rod when viewed from the rear end portion thereof in the same embodiment.

An operation rod 32 having a small diameter and projecting out of the valve body 20 is integrally and fixedly provided on the input rod 30 at a rear end portion thereof, as shown also in FIG. 11. An oil chamber 33 is formed between an end portion of the input rod 30 on the side of the operation rod 32 and the valve body 20 and communicates with a pilot-oil discharge port 40.

Further, the input rod 30 is provided with a large diameter portion 30*d* (diameter $D_6$) in the vicinity of its rear end and an oil chamber 34 formed due to a difference in diameter between the large diameter portion 30*d* and a main diameter portion (diameter $D_2$). The oil chamber 34 communicates with a tank 39 through a tank port 27.

A pair of notch portions 30g are axially provided an opposite sides of the operation rod 32 from the rear end surface (the left end surface in FIG. 10) and arranged to be communicated with the internal passage 30*c* so that pilot oil which has flowed in the back pressure chamber 24 is led to the pilot-oil discharge port (the tank port) 40 through the orifice 131, the internal passage 30*c* of the input rod 30, the notch portion 30*g*, and the oil chamber 33.

The pilot-oil discharge port 40 is arranged to be connected to a line returning to a tank 39 through a solenoid valve 25 which is a two-position directional valve.

Figure 2:
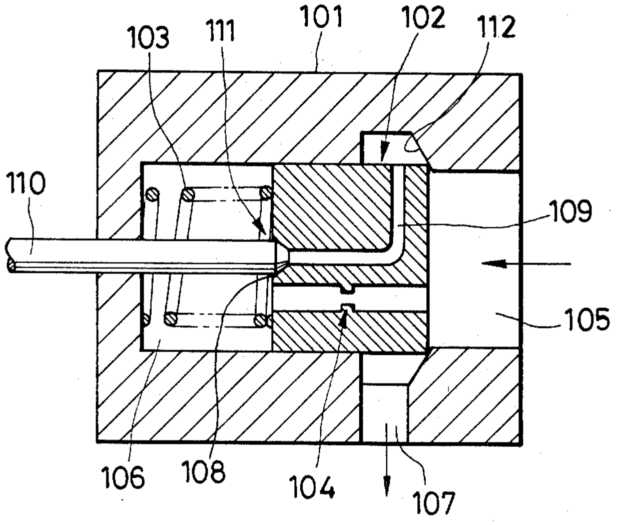
FIG. 2 PRIOR ART
FIG. 2 is a longitudinal section showing another conventional remote control poppet valve.

The operational principle of this embodiment is the same as that of the conventional example shown in FIG. 2. However, a large quantity of oil pressurized in the back pressure chamber 24 can be instantaneously discharged from the orifice 131 through the internal passage 30*c* because the diameter $D_2$ of the input rod 30 is considerably increased. Therefore, it is made possible to cause the poppet 21 to move at a high speed in response to a displacement of the input rod 30.

A difference in pressure receiving area between the large diameter portion 21*c* (diameter $D_3$) and the main diameter portion (diameter $D_1$) of the poppet 21, that is, $(\pi/4)\cdot(D_3^2-D_1^2)$, is selected to be substantially equal to an area of the front end portion (diameter $D_2$) of the input rod 30, that is, $(\pi/4)D_2^2$.

Therefore, in the case where the orifice 31 is in its fully closed state, the poppet 21 is caused to closely come into contact with the conical surface 20*a* of the valve body 20 by a closing force of the spring 25 because the pressure acting on the end surface 21*a* is balanced with that acting on the end surface 21*b* in the opposite direction.

The input rod 30, on the other hand, is not affected by a pressure in the back pressure chamber 24. Only the operation rod 32 having a small diameter ($D_5$) is projected outside. Generally, a pressure at the pilot-oil discharge port 40 (the tank port) acts on the operation rod 32, so that a projecting force of the operation rod 32 is remarkably small.

Consequently, when the operation rod 32 is displaced left in FIG. 10 at a high speed by a small operating force, the poppet 21 rapidly follows with the operation rod 32 because a large quantity of pilot oil is discharged through the large-diameter internal passage 30c from the orifice 31 formed between the large-diameter front end of the input rod 30 and the poppet 26.

Further, although the solenoid valve 25 is normally changed over so as to make the pilot-oil discharge port 40 communicate with the tank 39 so that a small quantity of pilot oil flowing into the back pressure chamber 24 through the orifice 46 flows form the pilot-oil discharge port 40 into the tank 39 in the steady state, the solenoid valve 25 can be changed-over into the blocked state as shown in FIG. 10 in an emergency so that an oil pressure in the back pressure chamber 24 is increased by pilot oil flowing from the inlet port 22 through the orifice 46 to thereby make it possible to move the poppet 21 toward the right end independently of the state of the input rod 30.

At this time, however, a left projecting force acts on the operation rod 32 by a pressing force due to an increase in pressure in the oil chamber 33 corresponding to the sectional area of the operation rod 32 (the diameter $D_5$).

Therefore, a pressing force is needed for cancelling the projecting force so that the pressing force and the projecting force are balanced with each other. This pressure force is generated by selecting the respective diameters $D_6$ and $D_2$ of the large diameter portion 30d and the main diameter portion of the input rod 30, and the diameter $D_5$ of the operation rod 32 to satisfy the relation $(\pi/4)\cdot(D_6^2-D_2^2)=(\pi/4)D_5^2$.

Sixth Embodiment

Figure 12:
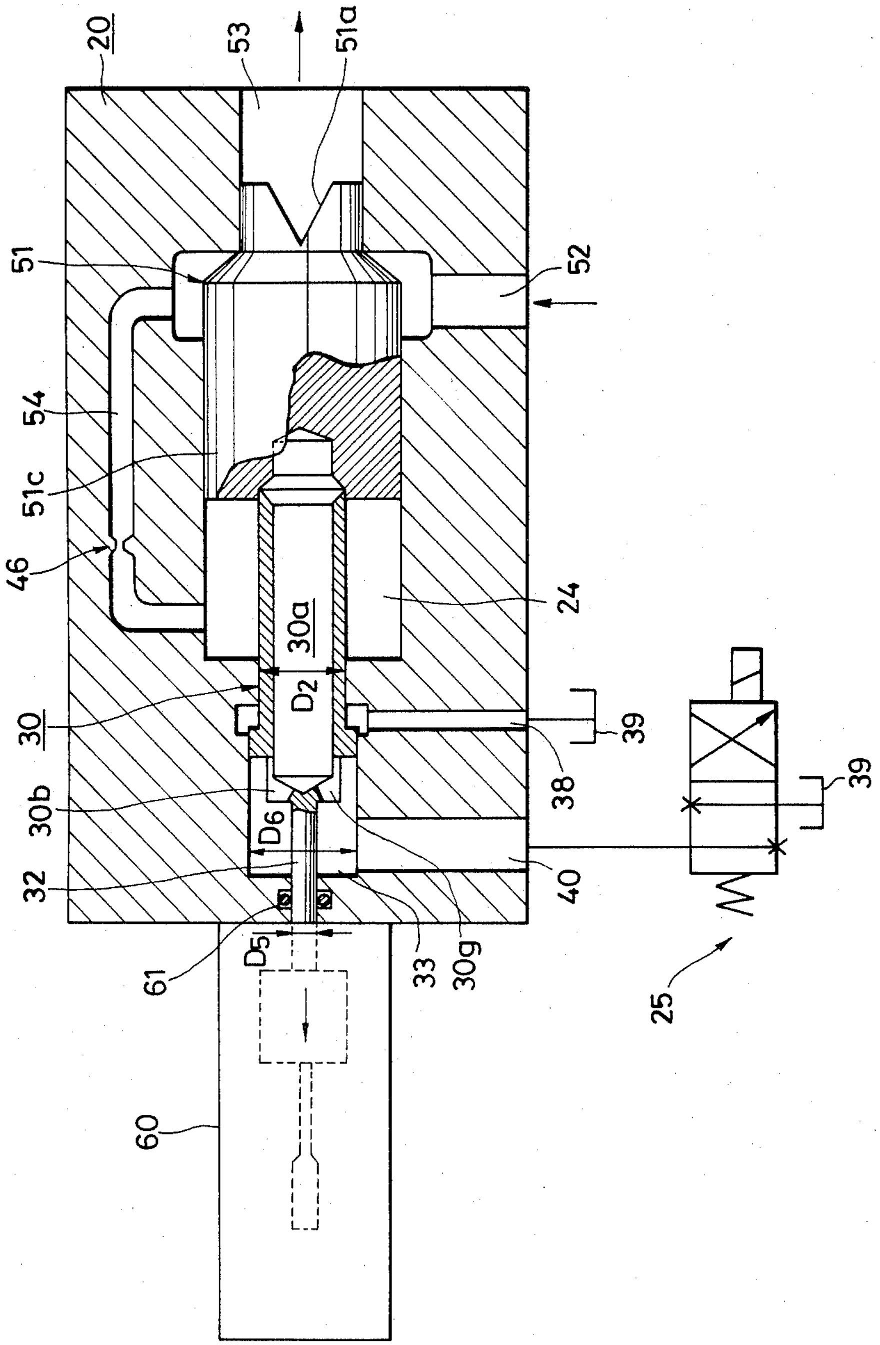
FIG. 12 is a longitudinal section showing a sixth embodiment according to the present invention.

FIG. 12 shows a sixth embodiment according to the present invention. In the embodiment of FIG. 12, items corresponding to those in FIG. 10 are correspondingly referenced, and the explanation of these items is omitted.

In this embodiment, a poppet 51 controls an opening of a flow path between an inlet port 52 and an outlet port 53 by a V-cut portion 51*a* formed in a cylindrical portion at the front end of the poppet 51. Note that the relationship in position between the inlet and outlet ports 52 and 53 is opposite to that of the embodiment of FIG. 10.

The poppet 51 is different from the poppet 21 of FIG. 10 in that the poppet 51 of this embodiment is provided with only a large diameter portion 51*c*.

Pilot oil is caused to flow from the inlet port 52 into a back pressure chamber 24 through a passage 54 having an orifice 26, both of which are formed in a valve body 20.

Further, an oil seal 61 is provided between the valve body 20 and an operation rod 32 so as to allow the operation of the operation rod 32 with high accuracy by using a proportional solenoid 60 provided with a position sensor.

No spring is necessary because a closing force is utilized which always acts on the poppet 51 in the case where there exists a difference in pressure between the inlet and outlet ports 52 and 53. Further, even in the case where there exists no difference in pressure, the opening of the flow path can be closed by pushing the operation rod 32 because the right and left forces acting on the operation rod 32 are balanced with each other as described above.

Seventh Embodiment

Figure 13:
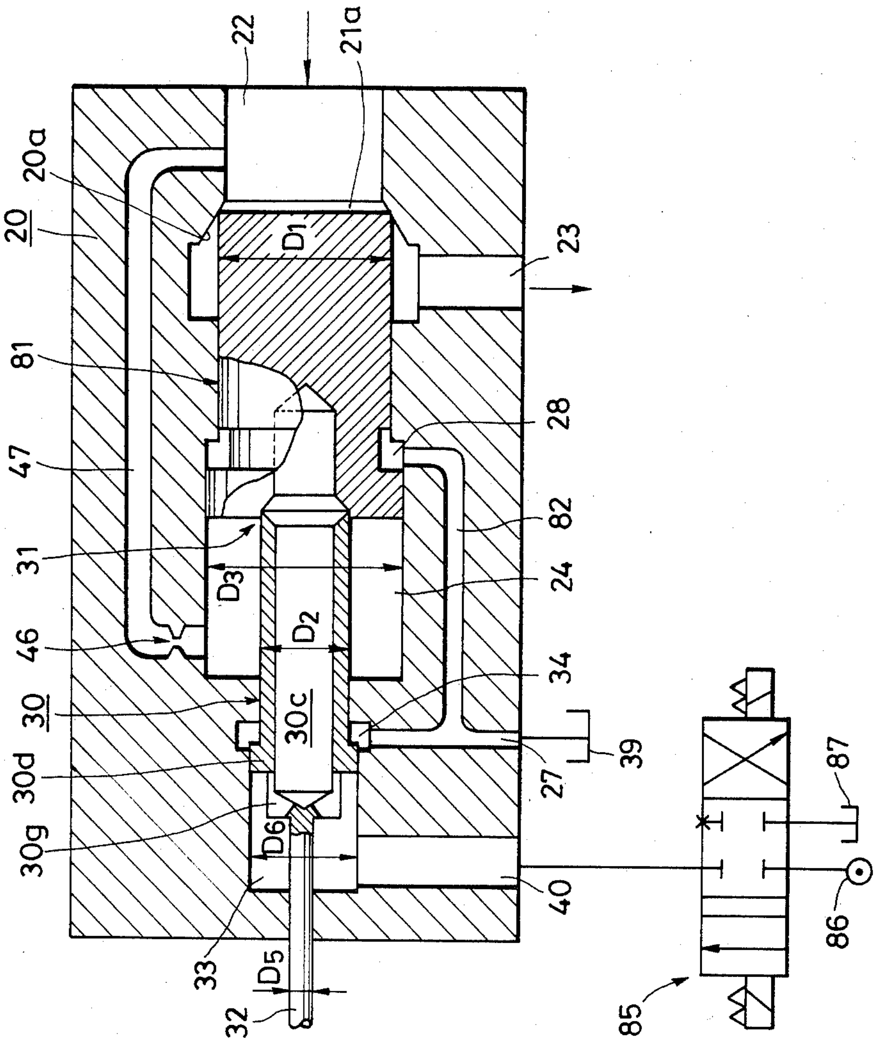
FIG. 13 is a longitudinal section showing a seventh embodiment according to the present invention.

FIG. 13 shows a seventh embodiment according to the present invention. In the embodiment of FIG. 13, items corresponding to those in FIG. 10 are correspondingly referenced, and the explanation of these items is omitted.

This embodiment is different from the fourth embodiment of FIG. 10 in that a poppet 81 is provided without the passage hole 21*g* of FIG. 10 and the spring 25 is not used. Also, the oil chamber 28 is communicated with the tank 39 through a passage 82. The pilot-oil discharge port 34 is arranged such that the connection can be changed-over into a hydraulic source 86 and a tank 87 through a solenoid valve 85 which is a three-position directional valve.

Although the solenoid valve 85 is normally changed-over so as to cause the pilot-oil discharge port 40 to communicate with the tank 87 so that a small quantity of pilot oil flowing into the back pressure chamber 24 through the orifice 26 flows from the pilot-oil discharge port 40 into the tank 87 in the steady state, the solenoid valve 85 may be changed over into the illustrated blocked state (in the same manner as in the fourth embodiment). Alternatively, the pilot-oil discharge port 40 may be changed over so as to be connected to the hydraulic source 86 in an emergency so as to cause a high pressure to act on the back pressure chamber 24 through the oil chamber 33 and the internal passage 30c in the input rod 30. As result, the poppet 81 can be caused to move to the fully closed position at the right end independently of the state of the input rod 30.

Eighth Embodiment

Figure 15:
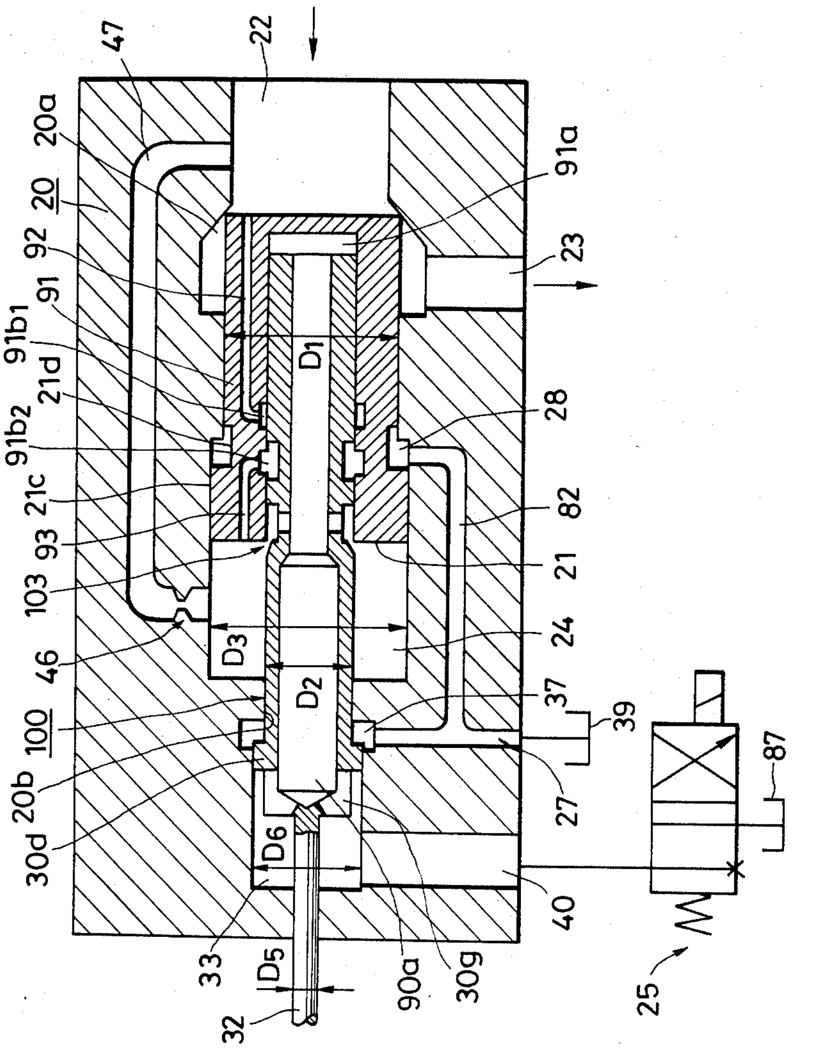
FIG. 15 is a longitudinal section showing a eighth embodiment according to the present invention.

FIG. 15 shows an eighth embodiment according to the present invention. In the embodiment of FIG. 15, items corresponding to those in FIGS. 10 and 12 are correspondingly referenced, and the explanation of these items is omitted.

Figure 14:
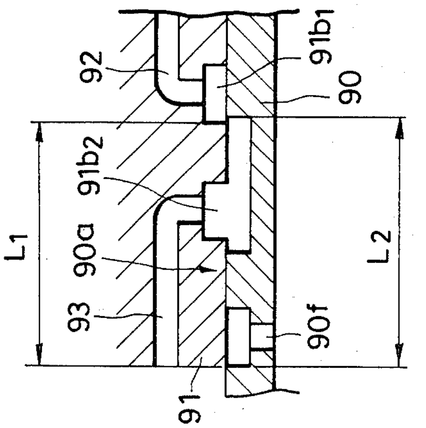
FIG. 14 is an enlarged section showing the main parts of an eighth embodiment for explaining the relationship between the land portion of the pilot spool and the circumferential grooves of the poppet.

The pilot spool 90 has a land portion 90*a* at its outer circumference, as shown in FIG. 14. The pilot spool 90 is arranged for axial movement such that the flow paths 92 and 93 communicate with each other either through a circumferential groove formed in the land portion 90*a* at the right side thereof, or alternatively are closed off from each other.

In the land portion 90*a*, as shown in FIG. 14, the lengths $L_1$ and $L_2$, determining the positions of grooves 90*f* and 91*b*, are selected such that $L_1 > L_2$. This difference can be neither too great, in which case there is leakage generated during positioning, nor too small, in which there are vibrations generated during change-over.

Figure 16:
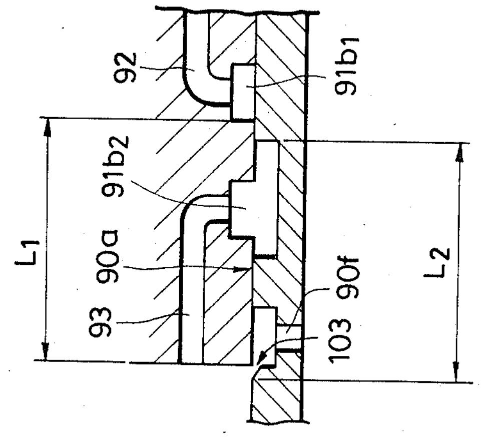
FIG. 16 is the enlarged section showing of the main parts of the same embodiment for explaining a variation of the relationship between the land portion of the pilot spool and the circumferential grooves of the poppet.

In place of the pilot spool 90, a pilot spool 100 provided at its land edge portion with a triangular notch groove 103 as shown in FIG. 16 can be used as an input rod. The passage 47 communicating the inlet port 22 and the back pressure chamber 24 with each other is provided in the same manner as in the fifth embodiment of FIG. 10.

In the stationary steady state, a flowing position control operation is performed on the basis of the flow rate of pilot flowing into the back pressure chamber 24 form the inlet port 22 through the orifice 46 in the same manner as in the embodiment of FIGS. 10 and 12. In closing control operation, when the operation rod 32 is caused to move in the closing direction with a large stroke, the flow paths 92 and 93 are opened. Then, a pressure at the inlet port 22 acts on the back pressure-chamber 24 to thereby make it possible to perform a closing operation at a high speed.

In this embodiment, the flow path 92 assumes its fully closed state in positioning the pilot spool 100 and the poppet 91. Therefore, if the dimensional relationship between the lengths $L_1$ and $L_2$ shown in FIG. 16 is selected to be $L_1 \geqq L_2$, no trouble is caused even in the case where the difference between $L_1$ and $L_2$ is increased because a leakage depends on the orifice 46. Even in the case where the difference is made too small, the flow path 92 is not opened in positioning the pilot spool 100 and the poppet 91, and therefore no vibration is ever generated in these members.

As described above, in the remote control poppet valve according to the second aspect of the present invention, pilot oil in the back pressure chamber is caused to flow into the pilot-oil discharge port provided separately from the main flow path through the hollow portion in the input rod. As a result, there is no possibility that pilot oil instantaneously flows into the main flow path to instantaneously move a cylinder or the like positioned downstream during the valve opening operation.

Further, the input rod (the pilot spool) is arranged so as to be operated by a small operating force, and further a large quantity of pressurized oil in the back pressure chamber can be caused to flow through the hollow portion in the input rod so that it is possible to drive the input rod at a high speed.

Moreover, the pilot-oil discharge port is normally connected to the line returning to the tank through the directional valve. The pilot oil discharge port is so arranged as to be closed or to be connected to the hydraulic source by switching the directional valve. Therefore, in an emergency, the poppet valve can be closed at a high speed independently of the position of the input rod by changing-over the connection. Accordingly, it is possible to perform an emergency operation with high reliability.

What is claimed is:

1. A poppet valve, comprising:

a valve body having a main flow path between an inlet port and an outlet port and having a back pressure chamber;

a poppet slidably accommodated in said valve body for movement between a first position for opening said main flow path, and a second position for closing said main flow path, said poppet having a front surface exposed to said inlet port and a read end surface exposed to said back pressure chamber;

a hollow poppet control member axially interacting with said poppet and projecting through said back pressure chamber into an oil chamber communicating with a discharge port outside said back pressure chamber, said poppet control member having an opening portion defined therein and a hollow defined therein in communication with said opening portion and said oil chamber; and means for supplying a portion of pilot oil at said inlet port to said back pressure chamber;

wherein said poppet control member communicates said opening portion with said back pressure chamber when said poppet control member is operated to move said poppet to said first position, and blocks communication between said opening portion with said back pressure chamber when said poppet control member is operated to move said poppet to said second position.

2. A poppet valve as recited in claim 1:

wherein said poppet control member is a hollow pilot spool slidably inserted in said poppet; and wherein said supply means comprises flow path opening/closing means provided at the surfaces of said poppet and said pilot spool sliding relatively to each other for opening/closing a flow path for supplying pilot oil from said inlet port to said back pressure chamber.

3. A poppet valve as recited in claim 2, wherein said supplying means further comprises a flow path in said valve body including an orifice therein connected between said inlet port and said back pressure chamber.

4. A poppet valve as recited in claim 2, wherein said valve body includes a flow path including an orifice therein connected between said back pressure chamber and said oil chamber.

5. A poppet valve as recited in claim 2, further comprising an operation rod having a diameter smaller than that of said pilot spool and being fixed at a first end to an end portion of said pilot spool projecting into said oil chamber, said operation rod having a second end projecting out of said valve body.

6. A poppet valve as recited in claim 2, further comprising a tank and a valve connecting said tank to said discharge port.

7. A poppet valve as recited in claim 2, further comprising a tank, an hydraulic source and a directional valve alternatively and selectively connecting said tank and said hydraulic source to said discharge port.

8. A poppet valve as recited in claim 2, wherein said poppet control member is a hollow input rod slidably provided in said valve body contractable with and separable from said poppet for causing said poppet to follow said input rod to thereby position said poppet, a hollow in said hollow rod communicating said back pressure chamber with said oil chamber and said discharge port.

9. A poppet valve as recited in claim 8, further comprising an hydraulic tank, an hydraulic source and a directional valve for alternatively and selectively connecting said discharge port to said hydraulic tank and said hydraulic source.

10. A poppet valve as recited in claim 9, further comprising a return line from said hydraulic tank to a region of said valve body adjacent said input rod.

11. A poppet valve as recited in claim 10, wherein said input rod has a large diameter portion of a diameter $D_6$ between a main diameter portion of a diameter $D_2$ and an operation rod of a diameter $D_5$, whereby a chamber formed by a difference of said diameters $D_5$ and $D_6$ is communicated with said discharge port and an oil chamber formed by a difference between said diameters $D_2$ and $D_6$ is communicated with said hydraulic tank.

12. A poppet valve, comprising:

a valve body having a main flow path between an inlet port and an outlet port and having a back pressure chamber;

a poppet slidably accommodated in said valve body for movement between a first position for opening said main flow path and a second position for closing said main flow path, said poppet being slidable in an axial direction and having a front surface with respect to said axial direction exposed to said inlet port and a rear end surface with respect to said axial direction exposed to said back pressure chamber;

a poppet control member axially slidably disposed in said poppet for movement between a first location for causing said poppet to move to said first position and a second location for causing said poppet to move to said second position, said poppet control member having a portion projecting in said axial direction through said back pressure chamber into an oil chamber, said oil chamber communicating with a discharge port disposed outside of said back pressure chamber, said poppet control member having a hollow passageway defined therein and an opening portion defined therein in communication with said hollow passageway, said hollow passageway being in communication with said oil chamber; and means for supplying a portion of pilot oil at said inlet port to said back pressure chamber when said poppet control member is at said second location;

wherein said opening portion is adapted for communicating with said back pressure chamber when said poppet control member is at said first location, and said opening portion is blocked from communicating with said oil chamber when said poppet control member is in said second location, said means for supplying the portion of pilot oil at said inlet port to said back pressure chamber being in communication with said back pressure chamber when said poppet control member is in said second location and being blocked from communication with said back pressure chamber when said hollow poppet control member is in said first location

* * * * *